United States Patent
Cassidy et al.

(10) Patent No.: US 12,014,230 B2
(45) Date of Patent: *Jun. 18, 2024

(54) MACHINE-READABLE CODE

(71) Applicant: Spotify AB, Stockholm (SE)

(72) Inventors: Keenan Cassidy, Stockholm (SE);
Damian Ferrai, Stockholm (SE);
Ludvig Strigeus, Gothenburg (SE);
Mattias Svala, Stockholm (SE);
Nicklas Söderlind, Stockholm (SE);
Jimmy Wahlberg, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/965,434

(22) Filed: Oct. 13, 2022

(65) Prior Publication Data

US 2023/0106825 A1    Apr. 6, 2023

Related U.S. Application Data

(63) Continuation of application No. 17/153,716, filed on Jan. 20, 2021, now Pat. No. 11,501,126, which is a
(Continued)

(30) Foreign Application Priority Data

Dec. 28, 2016 (EP) .................................. 16207062

(51) Int. Cl.
*G06K 19/06* (2006.01)
*G06K 7/14* (2006.01)

(52) U.S. Cl.
CPC ..... *G06K 19/06037* (2013.01); *G06K 7/1413* (2013.01); *G06K 7/1417* (2013.01);
(Continued)

(58) Field of Classification Search
CPC ........... G06K 19/06037; G06K 7/1413; G06K 7/1417; G06K 7/1426; G06K 7/1473; G06K 19/06028; G06K 19/06075
See application file for complete search history.

(56) References Cited

U.S. PATENT DOCUMENTS 5,608,200 A    3/1997 Le Goff et al.
5,854,478 A    12/1998 Liu et al.
(Continued)

FOREIGN PATENT DOCUMENTS

EP          0561334 A2      9/1993
HK      1502549.3M002      3/2015

OTHER PUBLICATIONS

European Communication Pursuant to Article 94(3) EPC from corresponding European Patent Application No. 16207062.7, dated Aug. 4, 2017.
(Continued)

*Primary Examiner* — Matthew Mikels
(74) *Attorney, Agent, or Firm* — Merchant & Gould P.C.

(57) ABSTRACT

Technology for generating, reading, and using machine-readable codes is disclosed. There is a method, performed by an image capture device, for reading and using the codes. The method includes obtaining an image, identifying an area in the image having a machine-readable code. The method also includes, within the image area, finding a predefined start marker defining a start point and a predefined stop marker defining a stop point, an axis being defined there between. A plurality of axis points can be defined along the axis. For each axis point, a first distance within the image area to a mark is determined. The distance can be measured from the axis point in a first direction which is orthogonal to
(Continued)

the axis. The first distances can be converted to a binary code using Gray code such that each first distance encodes at least one bit of data in the code.

20 Claims, 10 Drawing Sheets

Related U.S. Application Data continuation of application No. 16/181,902, filed on Nov. 6, 2018, now Pat. No. 10,922,595, which is a continuation of application No. 15/857,538, filed on Dec. 28, 2017, now Pat. No. 10,133,974.

(52) U.S. Cl.
CPC ......... *G06K 7/1426* (2013.01); *G06K 7/1473* (2013.01); *G06K 19/06028* (2013.01); *G06K 19/06075* (2013.01)

(56) References Cited

U.S. PATENT DOCUMENTS

| | | | |
|---|---|---|---|
| 6,032,861 A | 3/2000 | Lemelson et al. | |
| 6,398,117 B1 | 6/2002 | Oakeson et al. | |
| D741,882 S | 10/2015 | Shmilov et al. | |
| D749,623 S | 2/2016 | Gray et al. | |
| D750,129 S | 2/2016 | Kwon | |
| D755,196 S | 5/2016 | Meyers et al. | |
| D756,373 S | 5/2016 | Raskin et al. | |
| D757,028 S | 5/2016 | Goldenberg et al. | |
| D759,063 S | 6/2016 | Chen | |
| D763,277 S | 8/2016 | Ahmed et al. | |
| D767,624 S | 9/2016 | Lee et al. | |
| D768,152 S | 10/2016 | Gutierrez et al. | |
| D770,476 S | 11/2016 | Jitkoff et al. | |
| D771,116 S | 11/2016 | Dellinger et al. | |
| D776,683 S | 1/2017 | Gobinski et al. | |
| D786,280 S | 5/2017 | Ma | |
| D786,896 S | 5/2017 | Kim | |
| D788,123 S | 5/2017 | Shan | |
| D788,792 S | 6/2017 | Alessandri et al. | |
| D798,886 S | 10/2017 | Prophete et al. | |
| D800,742 S | 10/2017 | Rhodes | |
| D800,744 S | 10/2017 | Jitkoff et al. | |
| D803,235 S | 11/2017 | Markson et al. | |
| D806,108 S | 12/2017 | Day | |
| 10,133,974 B2 * | 11/2018 | Cassidy | G06K 19/06075 |
| 10,922,595 B2 * | 2/2021 | Cassidy | G06K 7/1413 |
| 11,501,126 B2 * | 11/2022 | Cassidy | G06K 7/1413 |
| 2005/0011957 A1 | 1/2005 | Attia et al. | |
| 2007/0152060 A1 | 7/2007 | Kilicoote | |
| 2009/0236508 A1 | 9/2009 | Huang | |
| 2010/0005035 A1 | 1/2010 | Carpenter et al. | |
| 2011/0127331 A1 | 6/2011 | Zhao | |
| 2013/0112760 A1 | 5/2013 | Schory | |
| 2017/0061184 A1 | 3/2017 | Wang | |

OTHER PUBLICATIONS

European Brief Communication in EP Application 18199246.2, dated Sep. 23, 2019, 4 pages.
European Decision to Refuse in EP Application 18199246.2, dated Jan. 20, 2021, 4 pages.
European Summons in EP Application 8199246.2, dated Jul. 16, 2019, 6 pages.
Extended European Search Report from related European Application No. 18199246.2, dated Jan. 18, 2019.
European Extended Search Report from related European Patent Application No. 16207062.7, dated Jul. 13, 2017.
U.S. Trademark Reg. No. 4,263,591, CISCO®, 2006, Cisco Technology, Inc., San Jose, California, United States. Available at: http://tsdr.uspto.gov/#caseNumber=85542742&caseSearchType=US_APPLICATION&caseType=DEFAULT&searchType=statusSearch.

* cited by examiner

MACHINE-READABLE CODE

CROSS-REFERENCE TO RELATED APPLICATIONS

This application is a Continuation of U.S. patent application Ser. No. 17/153,716, filed on Jan. 20, 2021, which is a Continuation of U.S. application Ser. No. 16/181,902, filed on Nov. 6, 2018, issued as U.S. Pat. No. 10,922,595, which is a Continuation of U.S. Application No. of Ser. No. 15/857,538 filed on Dec. 28, 2017, issued as U.S. Pat. No. 10,133,974, which claims priority to European Patent Application No. 16207062.7, titled MACHINE READABLE CODE, filed on Dec. 28, 2016, the disclosures of which are hereby incorporated by reference in their entireties. To the extent appropriate, a claim of priority is made to each of the above-disclosed applications.

BACKGROUND

Optical machine-readable codes have long been used. Examples include one-dimensional barcodes, such as Universal Product Code (UPC, e.g., UPC-A) barcodes, which have information encoded in the width and spacing of lines, and Intelligent Mail (IM) barcodes, which have information encoded in bars that extend up and/or down. Examples of optical machine-readable codes also include two-dimensional bar codes, such as Quick Response (QR) codes, which encode information in a regular grid of black and white pixels with visible tracking markers. Two-dimensional codes may also use rectangles, dots, hexagons and other geometric patterns in two dimensions to represent data. Modern two-dimensional bar codes, that are associated with a specific company, are often called "scannables". Tracking markers are necessary in the existing codes to align the capture image to a grid for reading the code. Such tracking markers can disrupt the appearance of the scannable.

SUMMARY

In general terms this application is directed to generating, reading, and using machine-readable codes. In one possible configuration and by non-limiting example, there is a method of reading an optical machine-readable code performed by an image capture device, the method including: capturing a digital image with an image sensor of the image capture device; identifying an image area in the captured digital image, the image area comprising the machine-readable code; within the image area, finding a predefined optical start marker defining a start point and finding a predefined optical stop marker defining a stop point, wherein an axis is defined between the start point and the stop point; defining a plurality of axis points along the axis; for each axis point, determining a first distance within the image area to an optical mark, measured from the axis point in a first direction which is orthogonal to the axis; and translating the first distances to a binary code using Gray code, each first distance encoding at least three bits of the binary code.

In another possible configuration, there is a non-transitory computer readable medium comprising instructions executable by a processor to perform a method. The method can include capturing a digital image using an image sensor of the image capture device; identifying an image area in the captured digital image, the image area comprising the machine-readable code; within the image area, finding a predefined optical start marker defining a start point and find a predefined optical stop marker defining a stop point, an axis being defined between the start point and the stop point; defining a plurality of axis points along the axis; for each axis point, determining a first distance within the image area to an optical mark, measured from the axis point in a first direction which is orthogonal to the axis; and translating the first distances to a code.

In yet another possible configuration, there is a method for generating an optical machine-readable code, the method comprising: obtaining data; translating the data into first distances within an image area, each of the first distances being measured from an axis point on an axis in the image area, in a first direction which is orthogonal to the axis; forming a mark at the end of each of the first distances in the image area; forming a start marker at a first end of the axis, wherein the start marker defines a start point; forming a stop marker at a second end of the axis, wherein the stop marker defines a stop point; and providing the image area.

According to another aspect of the present disclosure, there is provided a computer program product comprising computer-executable components for causing an image capture device to perform an embodiment of a method of the present disclosure when the computer-executable components are run on processing circuitry of the image capture device.

According to another aspect of the present disclosure, there is provided an image capture device for reading an optical machine-readable code. The image capture device includes processing circuitry, and storage storing instructions executable by the processing circuitry whereby the image capture device captures an image using an image sensor of the image capture device. The image capture device is also configured to identify an image area in the captured digital image, the image area having the machine-readable code. The image capture device is also configured to, within the image area, find a predefined optical start marker defining a start point and find a predefined optical stop marker defining a stop point, an axis being defined between the start point and the stop point. The image capture device is also configured to define a plurality of axis points along the axis. The image capture device is also configured to, for each axis point, determine a first distance within the image area to an optical mark, measured from the axis point in a first direction which is orthogonal to the axis. The image capture device is also configured to translate the first distances to a binary code using Gray code, each first distance encoding at least three bits of the binary code. The image capture device may thus be arranged to perform embodiments of the method of reading an optical machine-readable code in accordance with the present disclosure. The image capture device may, for example, be a smartphone having a digital camera.

According to another aspect of the present disclosure, there is provided a method performed by a code generator. The method includes obtaining a binary code. The method also includes translating the binary code, using Gray code, into first distances within an image area, each of the first distances being measured from an axis point on an axis in the image area, in a first direction which is orthogonal to the axis. The method also includes forming an optical mark at the end of each of the first distances in the image area. The method also includes, at each end of the axis, forming an optical start marker and stop marker, respectively, defining a start point and a stop point, respectively, of the axis within the image area. The method also includes compositing the image area in an image. The method also includes presenting the digital image on an optical display whereby the optical marks form an optical machine-readable code in the image area in the digital image.

According to another aspect of the present disclosure, there is provided a computer program product having computer-executable components for causing a code generator to perform an embodiment of a method of the present disclosure when the computer-executable components are run on processing circuitry comprised in the code generator.

According to another aspect of the present disclosure, there is provided a code generator having processing circuitry, and storage storing instructions executable by the processing circuitry whereby the code generator is configured to obtain a binary code. The code generator is also operative to translate the binary code, using Gray code, into first distances within an image area, each of the first distances being measured from an axis point on an axis in the image area, in a first direction which is orthogonal to the axis. The code generator is also configured to form an optical mark at the end of each of the first distances in the image area. The code generator is also configured to, at each end of the axis, form an optical start marker and stop marker, respectively, defining a start point and a stop point, respectively, of the axis within the image area. The code generator is also configured to composite the image area in a digital image. The code generator is also configured to present the digital image on an optical display whereby the optical marks form an optical machine-readable code in the image area in the digital image. The code generator may thus be arranged to perform embodiments of the method for generating a code in accordance with the present disclosure.

BRIEF DESCRIPTION OF THE DRAWINGS

Embodiments will be described, by way of example, with reference to the accompanying drawings, in which.

DETAILED DESCRIPTION

Figure 1:
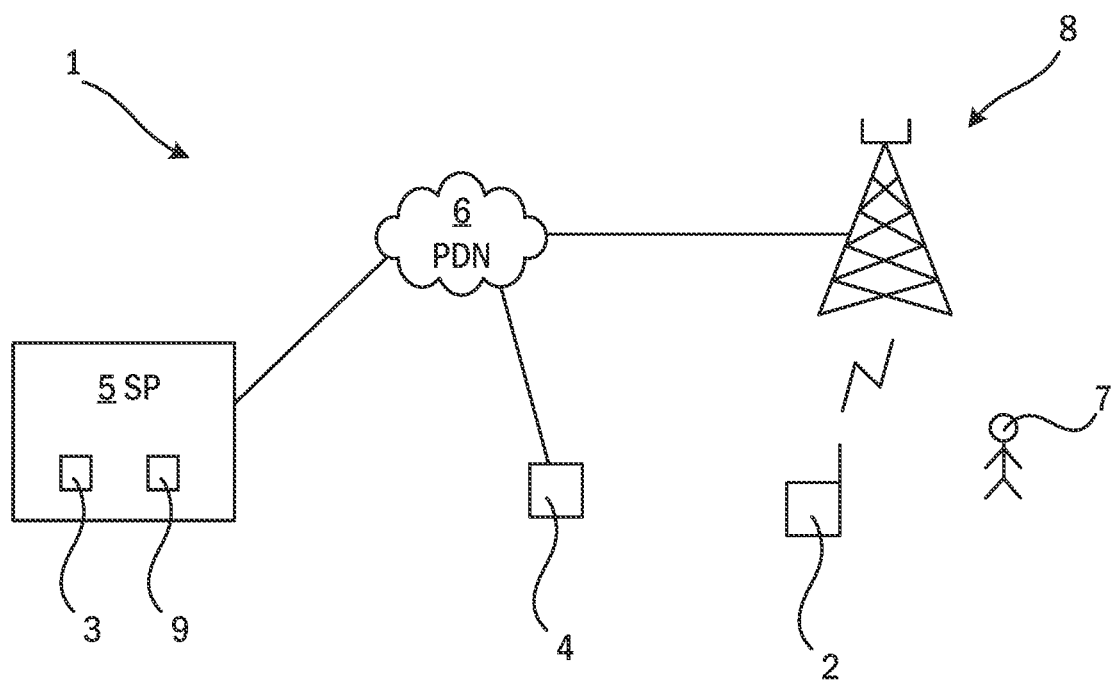
FIG. 1 is a schematic diagram of an example communication network system with which aspects of technologies disclosed herein may be used.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Some embodiments according to the present disclosure provide an alternative and, in some applications, more practical way of generating, presenting, reading, and interpreting an optical machine-readable code. The optical machine-readable code may be designed to convey, in its visual appearance, an association to streaming sound and music, without any disrupting tracking markers. The tracking markers (e.g., start, stop, and reference markers) may be associated with the code in a manner to further the association to streaming sound and music. By generating the optical machine-readable code such that distances from an axis encode the data held by the optical machine-readable code (e.g., binary code), a more practical alternative to conventional barcodes may be obtained, depending on the application. The optical machine-readable code may, for example, work better (e.g., better fit or blend) with the digital image as a whole.

It is to be noted that any feature of any of the aspects disclosed herein may be applied to any other aspect herein, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second", and the like for different features/components of the present disclosure are only intended to distinguish the features/components from other similar features/components and not to impart any order or hierarchy to the features/components.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

FIG. 1 illustrates an embodiment of a communication network system 1 with which aspects of technologies disclosed herein may be used. The system 1 includes an image capture device 2, such as a wired or wireless device (e.g., a radio device) having an image sensor for capturing an image. In some examples, the image capture device 2 may be any device or user equipment (UE), whether mobile or stationary, enabled to communicate over a radio channel in a communication network system 1. For instance, the device 2 may, but need not, be limited to, a mobile phone, a smartphone, a media player, a camera, a tablet computer, a laptop, a personal computer (PC), or a consumer electronic device. Preferably, the image capture device 2 is a smartphone having a camera with a digital image sensor. The figure illustrates a user 7 using the image capture device 2.

Where the image capture device 2 is a radio device, it may be connected to a network such as a Packet Data Network (PDN) 6 (e.g., the Internet) via any Radio Access Network (RAN) 8 (e.g., a Local Area Network (LAN) or a cellular network in accordance with a Third Generation Partnership Project (3GPP) communication standard) having one or more base stations.

The image capture device 2 may be in the vicinity of an optical display 4 (e.g., an LCD or AMOLED panel of a smartphone or tablet) that presents an optical digital image. The device 2 can use its image sensor to capture the optical digital image.

The optical display 4 can be included in or communicatively connected to a code generator 3 (e.g., via the PDN 6). The code generator 3 is configured to generate an optical machine-readable code for display in the digital image on the optical display 4. The code generator 3 may, for example, be hosted by a service provider (SP) 5 having a server 9.

Figure 2:
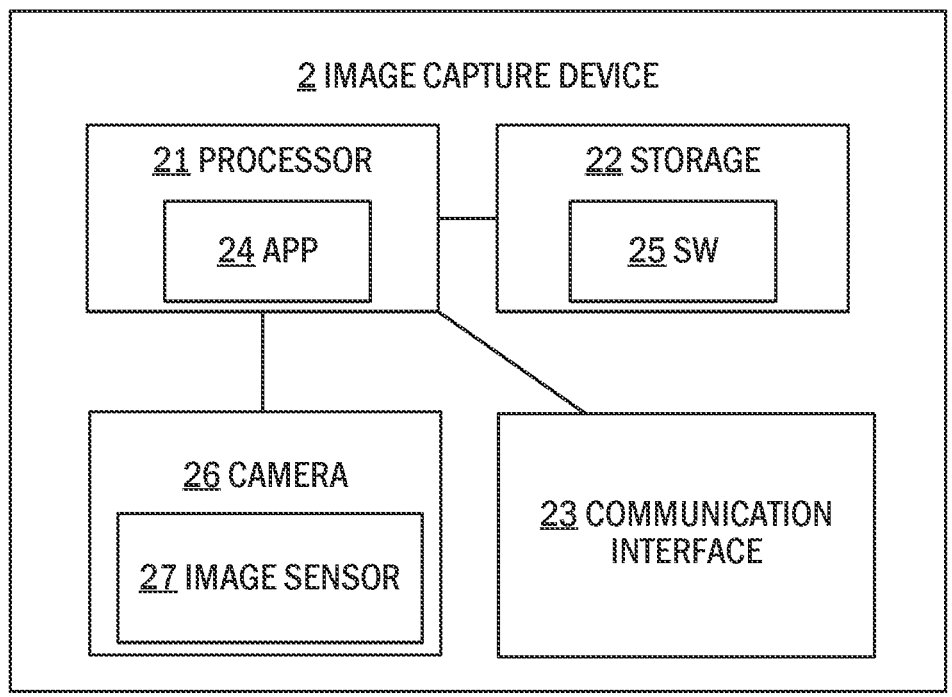
FIG. 2 is a schematic block diagram of an example image capture device.

FIG. 2 illustrates an example embodiment of the image capture device 2 (e.g., a smartphone). The image capture device 2 includes processing circuitry 21 (e.g., a central processing unit). The processing circuitry 21 can include one or more processing units in the form of microprocessor(s). However, other suitable devices with computing capabilities can make up the processing circuitry 21, such as an application specific integrated circuit (ASIC), a field programmable gate array (FPGA), or a complex programmable logic device (CPLD). The processing circuitry 21 can be configured to run one or several computer program(s) or software (SW) 25 (see also FIG. 4) stored in a storage 22 of one or more storage unit(s) (e.g., memory). The software 25 can include, for example application software for a software application (app) 24 for making the image capture device 2 perform an embodiment of a method of the present disclosure. The app 24 can be formed by the processing circuitry 21 running the application software. The storage 22 can be regarded as a computer readable medium (see, e.g., computer readable medium 42 of FIG. 4). The computer readable medium can include, for example, Random Access Memory (RAM), flash memory, other solid state memory, a hard disk, or combinations thereof. The computer readable medium can include a non-transitory computer readable medium. The processing circuitry 21 can be configured to store data in the storage 22, as needed.

The image capture device 2 can also include an image sensor 27. The image sensor 27 is typically a portion of a camera 26 integrated in the image capture device 2. The image sensor 27 may take various forms, including, for example, a semiconductor charge-coupled devices (CCD), or active pixel sensors in complementary metal-oxide-semiconductor (CMOS), or N-type metal-oxide-semiconductor (NMOS, Live MOS) image sensor. Further, the image capture device 2 may include a communication interface 23 (e.g., a radio interface) for communication within the communication network system 1 (e.g., with the SP 5) such as with the server 9 thereof.

Figure 3:
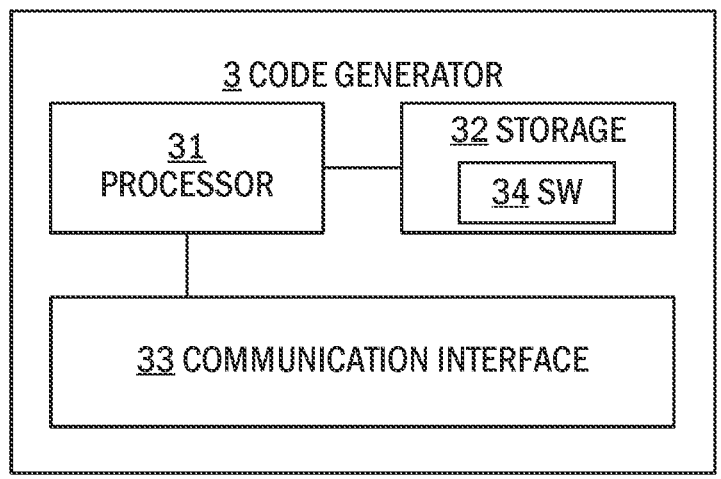
FIG. 3 is a schematic block diagram of an example code generator.

FIG. 3 illustrates an embodiment of a code generator 3. The code generator 3 can include processing circuitry 31 (e.g., a central processing unit). The processing circuitry 31 can include one or more processing units in the form of microprocessors. However, other suitable devices with computing capabilities can also be included in the processing circuitry 31 (e.g., an ASIC, FPGA, or CPLD). The processing circuitry 31 can be configured to run one or more computer program(s) or software (SW) (see also software 34 of FIG. 4) stored in a storage 32 that may include one or more storage unit(s) (e.g., a memory). The storage units can be regarded as a computer readable medium 42 (see FIG. 4) as discussed herein and may, for example, be in the form of RAM, flash memory, solid state memory, a hard disk, or combinations thereof. The storage can include a non-transitory computer readable medium. The processing circuitry 31 can also be configured to store data in the storage 32, as needed. The code generator 3 can also include a communication interface 33 for communication within the communication network system 1, for example with the SP 5 (e.g., such as with the server 9 thereof or with the optical display 4 which may or may not be part of the code generator 3).

In an example the storage 32 includes instructions that, when executed by the processing circuitry 31, cause the generator 3 to create an optical code decodable using one or more techniques disclosed herein. In an example, the instructions cause the processing circuitry to obtain a binary code (e.g., a binary representation of content to be stored in an optical code) to be encoded into an optical code. The instructions can cause the processor to translate the binary code, using Gray code, into first distances within an image area, each of the first distances being measured from an axis point on an axis in the image area, in a first direction which is orthogonal to the axis. The instructions can also cause the processing circuitry 31 to form an optical mark at the end of each of the first distances in the image area. The instructions can also cause the processing circuitry 31 to, at each end of the axis, form an optical start marker and stop marker, respectively, defining a start point and a stop point, respectively, of the axis within the image area. The instructions can also cause the processing circuitry 31 to composite the image area in a digital image and provide digital image, such as on an optical display whereby the optical marks form an optical machine-readable code in the image area in the digital image. The code generator 3 may thus be arranged to perform embodiments of the method for generating a code in accordance with the present disclosure.

Figure 4:
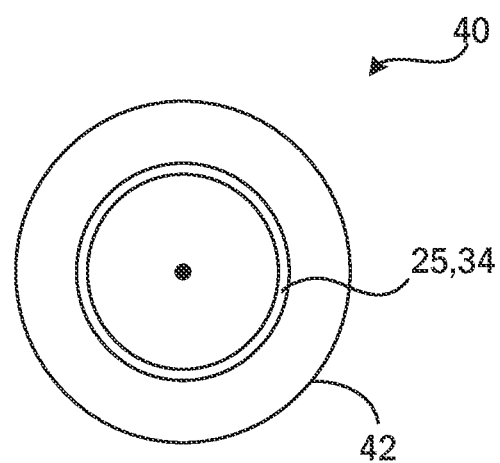
FIG. 4 is a schematic illustration of an example computer program product.

FIG. 4 illustrates an embodiment of a computer program product 40. The computer program product 40 includes a computer readable (e.g. non-volatile and/or non-transitory) medium 42 having software/computer program 25 and/or 34 in the form of computer-executable components. The computer program 25/34 can be configured to cause an image capture device 2 or code generator 3 (e.g., as discussed herein) to perform an embodiment of a method of the present disclosure. The computer program may be run on the processing circuitry 21/31 of the image capture device 2 or code generator 3 to cause it to perform the method. The computer program product 40 may, for example, be included in a storage unit or memory 22/32 of the image capture device 2 or code generator 3 and may be associated with the processing circuitry 21/31. Alternatively, the computer program product 40 may be, or be a part of, a separate (e.g., mobile) storage medium, such as a computer readable disc (e.g., a CD or DVD), a hard disc, a hard drive, or a solid state storage medium (e.g., a RAM or flash memory). Embodiments of the present disclosure can be conveniently implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, a scannable code (herein called an "optical machine-readable code" or, simply, an "optical code") may be generated with the information encoded in a representation. The representation may be one that a user may associate with a soundwave. The association may be strengthened by an animation lead in that shows the optical code as a moving soundwave.

Figure 5:
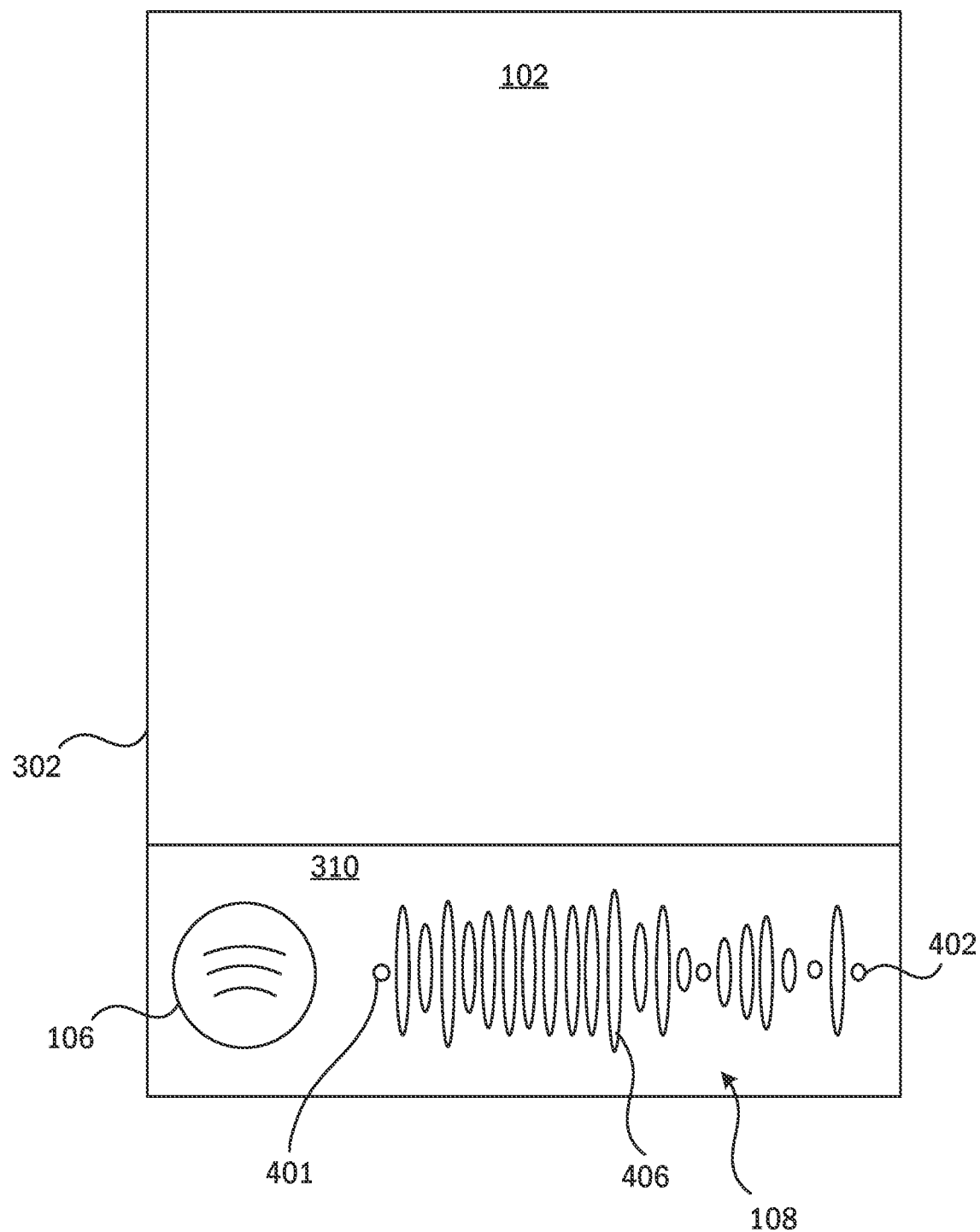
FIG. 5 is a schematic illustration of an example a digital image.
Figure 6A:
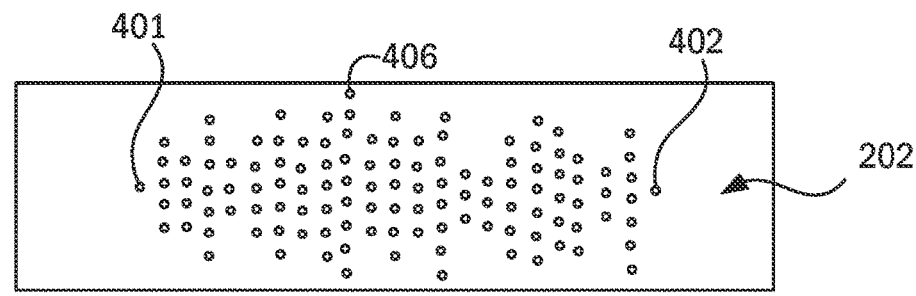
FIG. 6A illustrates an example representation of an optical machine-readable code.
Figure 6B:
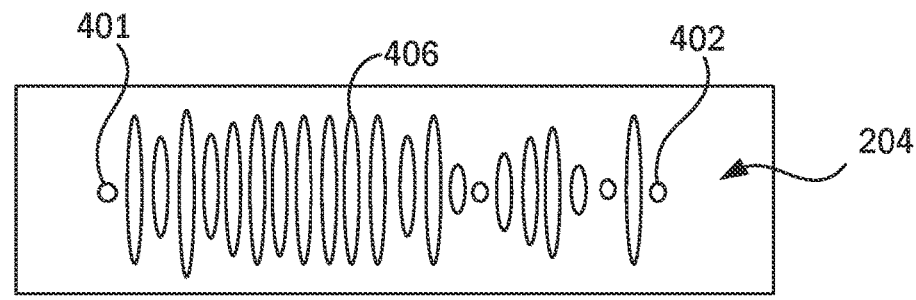
FIG. 6B illustrates an example representation of an optical machine-readable code.
Figure 6C:
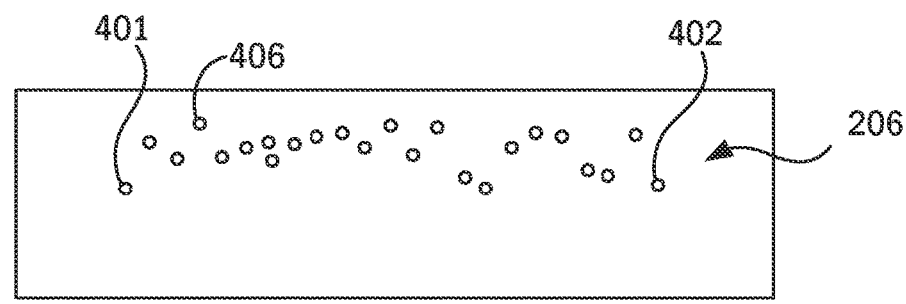
FIG. 6C illustrates an example representation of an optical machine-readable code.
Figure 6D:
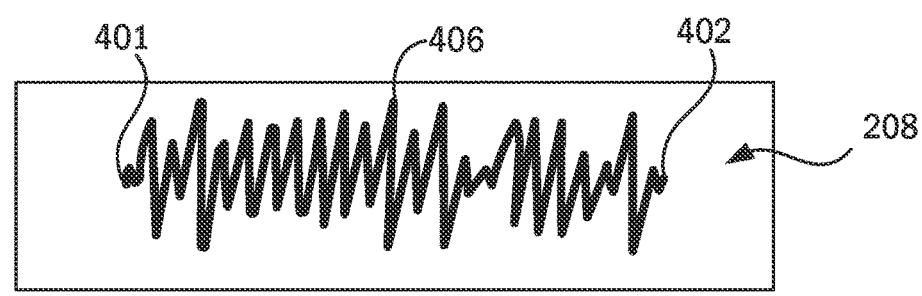
FIG. 6D illustrates an example representation of an optical machine-readable code.
Figure 6E:
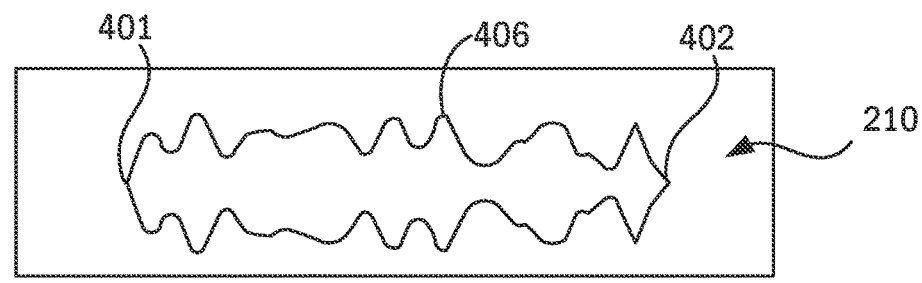
FIG. 6E illustrates an example representation of an optical machine-readable code.

FIG. 5 illustrates an example digital image 302 that includes an area 102 and an image area 310. The area 102 may include an image with overlaid text, graphics, and/or logotypes (e.g., album art). The image area 310 may contain a media company logotype 106 and an optical machine-readable code 108. The optical machine-readable code 108 can include a start marker 401, a stop marker 402, and a reference mark 406.

The optical machine-readable code 108 can be visually similar to (e.g., be associated with) a soundwave. There are several possible ways to make this association. Some examples are shown in FIG. 6A-E, which show optical machine-readable code examples 202, 204, 206, 208, and 210 as having different possible representations that are visually similar to a soundwave. Example 202 includes a number of dots within columns (e.g., rectangular regions). Example 204 includes bars. Example 206 includes a single dot per column. Example 208 includes a single-line contour. Example 210 includes double-line contours.

Figure 7:
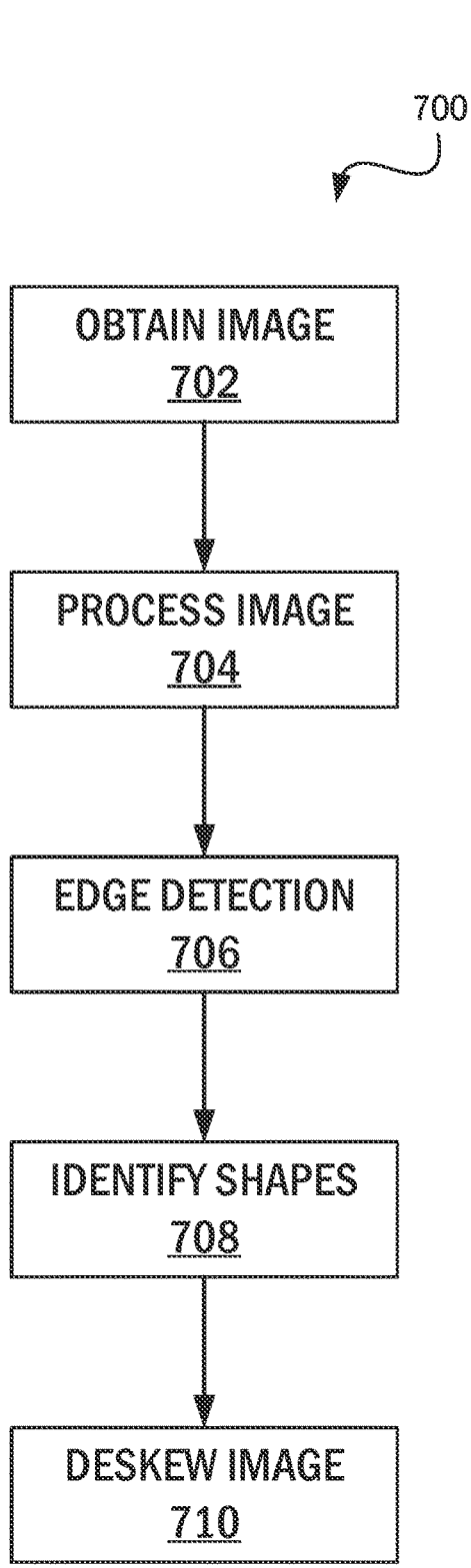
FIG. 7 illustrates an example process for identifying and preparing images for deciding.

An optical machine-readable code 108 may be decoded in a variety of ways. In some examples the decoding process can begin with preparing an image for decoding. FIG. 7 illustrates an example process 700 for identifying and preparing images for decoding.

Figure 8A:
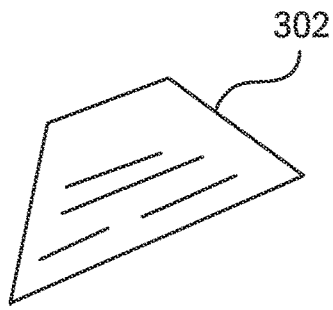
FIG. 8A illustrates an example of an image that can be obtained at an image capture device.

The process 700 can begin with operation 702, which involves obtaining an image. The image can be obtained in a variety of ways, such as by being captured by the camera 26 or selected from a library of photos. FIG. 8A illustrates an example of an image 302 that may be obtained. As can be seen, the object in the image 203 is skewed due to, for example, the image being taken non-orthogonally to the object in the image.

The process 700 can continue to operation 704, which involves processing the obtained image. This processing can include manipulating the image to make it easier to process in later steps. For example, the image can be processed by converting it to grayscale, increasing or decreasing contrast, increasing or decreasing brightness, and reducing noise, among others.

The process 700 can continue to operation 706, which involves performing edge detection. The image can be further processed by, for example, performing edge detection within the image. Edge detection can be performed in a variety of ways, such as by using, for example, edge detection algorithms from a computer vision library, such as OPENCV.

The process 700 can continue to operation 708, which involves identifying shapes in the image. For example, the shapes can be quadrilaterals. Edges that cross in a pattern that may indicate a quadrilateral (e.g., a rectangle viewed in perspective). Shapes of interest are selected for closer examination (e.g., selected as candidates for parsing). In the example image illustrated in FIG. 8b, there are three quadrilaterals: quadrilateral 304, quadrilateral 306, and the quadrilateral formed by the outer boundary of the combination of quadrilateral 304 and quadrilateral 306. Each quadrilateral is a candidate area that may contain an optical machine-readable code.

The operation 708 can further involve identifying quadrilaterals likely to contain an optical machine-readable code. For example, where a code (e.g., a code for which the method is configured to decode) has an overall elongate shape (e.g., as seen in the codes in FIGS. 6A-E), identifying likely candidates involves identifying quadrilaterals having two sides much longer than the other two (e.g., having an elongate shape, such as quadrilateral 306 in FIG. 8b). If so, the likely candidate can be used for processing.

The operation 708 can further involve generating candidate rotated shapes. For example, the same code may yield different encoded data (e.g., messages) depending on how it is rotated. Generating candidate rotations may be based on the configuration of the code and the shape. For example, where both the shape and the code are elongate, two rotations may be used: a first image where one elongate side is above another elongate side and another image generated by rotating the first image 180 degrees. If the sides are of similar length, then four rotations are tested. For instance, where the shape is a square, the rotations may be 90 degrees to each other where each end of the shape is on top.

The process 700 can further involve straightening or otherwise deskewing the image or a portion thereof. For example, where the image is based on a photo of a code taken by a user, the image will likely have some skew (e.g., not have been taken straight-on). The skew can be corrected using, for example, perspective correction features of OPENCV.

Figure 8B:
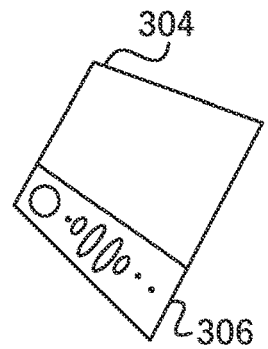
FIG. 8B illustrates another example of an image that can be obtained at an image capture device.
Figure 8C:
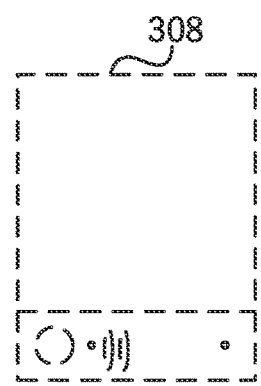
FIG. 8C illustrates an example deskewed image.
Figure 8D:
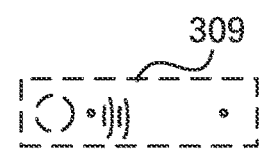
FIG. 8D illustrates another example deskewed image.

FIGS. 8c and 8d illustrate example deskewed rectangles 308 and 309, respectively, based on the image of FIG. 8b. For example, the straightened rectangles 308 and 309 are filled with pixels that fetch their color information from respective locations in the quadrilateral candidate in the image. For instance, the perspective quadrilateral 306 is transformed into a flat 2D rectangle 309. In another example, if the rectangle 308 is filled (e.g., transformed to correct a skew), the pixels can be copied from the lower part of 308 (e.g., corresponding to quadrilateral 306) into rectangle 309. Then the candidate code in rectangle 309 can be analyzed.

Figure 10:
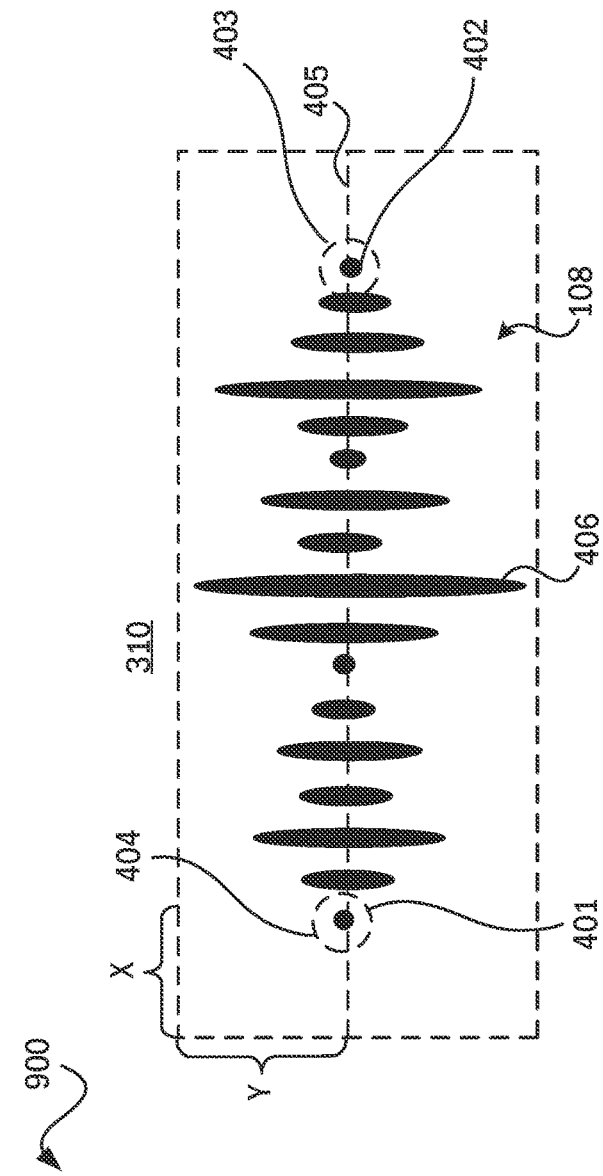
FIG. 10 illustrates an embodiment of an optical machine-readable code.
Figure 9:
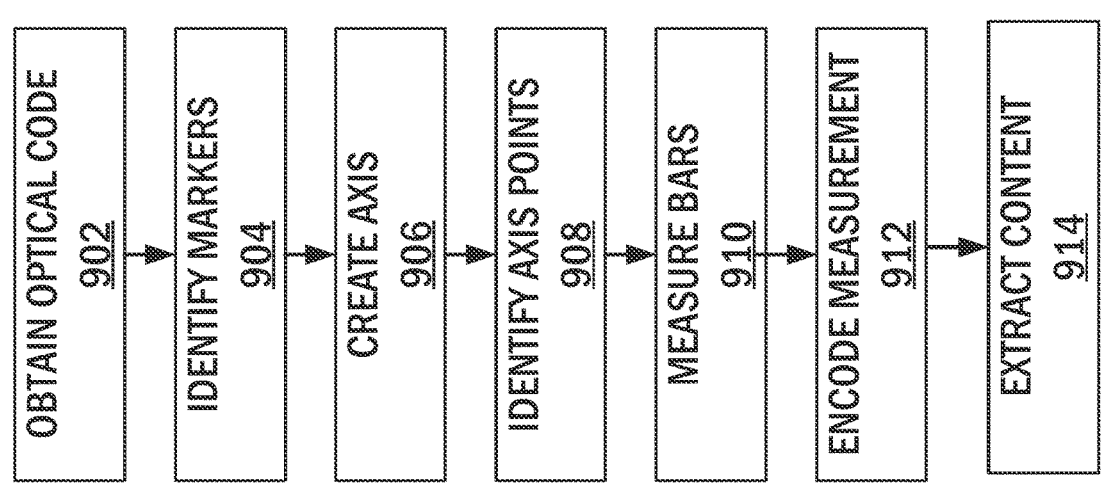
FIG. 9 illustrates an example process for analyzing a candidate code.

FIG. 9 illustrates an example process 900 for analyzing a candidate code, such as a candidate code identified in the process 700 of FIG. 7. The process 900 will be described in relation to the optical machine-readable code 108 in FIG. 10, but need not be so limited. The optical machine-readable code 108 can have a minimum offset at the start marker 401 and at the stop marker 402. The offset can be represented as the length of a bar as used in optical machine-readable code example 204. In other examples, the offset may alternatively be a distance from an invisible center line (herein called axis) 405 to a dot of an optical code (e.g., as in the optical code 206) or to a line-contour of an optical code (e.g., as in the optical code 208), or the distance between two line-contours of a code (e.g., as may be seen in the code 210), or a number of dots within a rectangular region of a code (e.g., as in code 202), or any other optical marks offset from the axis 405.

The process 900 can begin with operation 902, which involves obtaining a candidate optical-machine readable code. The candidate code can be obtained in a variety of ways, including, for example through the process 700 described in FIG. 7. In some examples, there may be multiple candidate codes to be processed. For instance, there may be four different candidate codes for one image of a code (e.g., obtained from the process 700), with each candidate corresponding to a different rotation of the image.

The process 900 can include operation 904, which involves identifying markers within the code 108. This can involve identifying the location of the start marker 401 within the start area 404 and the location of the stop marker 402 within the stop area 403. In an example, this may be done by testing for all possible locations within areas 403 and 404 and testing if there is a region (e.g., disc) of light or darkness at that point. In some examples such a process can involve detecting a known shape of a marker using a shape detection algorithm, such as one found in OPENCV. For example, it may be predetermined that the start marker 401 and the stop marker 402 may have a circular shape and the markers 401, 402 may be detected by identifying circular shapes within the image. In an example, the markers 401, 402 may be configured to be a particular horizontal distance x and a particular vertical distance y away from other features (e.g., other portions of the image area 310), and identifying the markers can be based on the distance.

The process 900 can include operation 906, which involves creating a virtual axis 405. With the location of start marker 401 and stop marker 402 established, the virtual axis 405 can be drawn from the start marker 401 to the stop marker 402. At a point along the axis (e.g., in the middle of the axis 405), there may be a reference mark 406 (e.g., located at the end of a bar to fit in with the visualization of the optical code 108) representing a maximum offset from the axis 405.

The process 900 can include operation 908, which involves identifying axis points. For example, the pixels along axis 405 may be scanned to find axis points that represent the horizontal position of each vertical bar within the code 108. The vertical bars within the code can have ends representing an optical mark. The axis points can be identified by examining the alternating patterns of light and dark.

Figure 11:
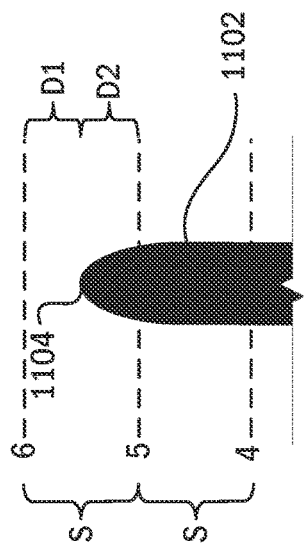
FIG. 11 illustrates an example of determining the error for a marker.

The process 900 can include operation 910, which involves measuring the bars and determining error values for the bars. This can involve, for example, obtaining the offset. For example, the offset may be the orthogonal distance from the axis 405 (here the length of each bar) of start marker 401 and stop marker 402 and the reference mark 406, which indicates the maximum offset. The offset may then be divided by a step size for the possible length values encoded in the bars (e.g., optical marks) in the optical code 108. For example, the possible lengths of bars may vary in steps (e.g., the lengths may be between 3 mm and 30 mm in 3 mm steps) rather than being continuous (e.g., the lengths may be any length between 3 mm and 30 mm). Each bar is then measured in length (e.g., from its respective axis point to the optical mark of the end of the bar) and rounded to the nearest step size. An error value (certainty) is encoded based on the difference between the measured distance and the calculated exact step size. Thus if the length is exactly an integer-multiple of the step size the error value is 0%, if it is exactly between two step sizes, then the error would be 100%. FIG. 11 illustrates an example of determining the error for a bar 1102. As illustrated, there is a step size s and the end 1104 of the bar 1102 is located distance D1 from step six and distance D2 from step five. In the illustrated example, because D1 is substantially equal to D2, the error is 100%.

The process 900 can include operation 912, which involves converting the measurement of the bars into a code. For example, each measured distance other than the fixed lengths of the start markers 401, the stop marker 402, and the reference mark 406, encodes a number of bits of data (e.g., at least three bits). The distances are encoded using, for example, a Gray code table such that only a single bit changes between each length step. An example of such a table for encoding eight different lengths is shown in TABLE I, below.

TABLE I

| Line length | Bits (abc) |
| --- | --- |
| 0 | 000 |
| 1 | 001 |
| 2 | 011 |
| 3 | 010 |
| 4 | 110 |
| 5 | 111 |
| 6 | 101 |
| 7 | 100 |

For example, a line length of five steps would correspond to bits "111". Advantageously, if an optical mark (e.g., the end of the bar) is measured to lie between the distance of steps three and four, only a single bit is uncertain because only one bit changes between the encodings for steps of three and four (e.g., the possible bits would be: 010, which corresponds to three, and 110, which corresponds to four). If, instead of a Gray code, regular binary encoding had been used, all three bits had been uncertain because all three bits change in the encoding between the binary values of three (011) and four (100). Each measured distance in the above example thus generates three bits with only one bit being potentially uncertain. Of course, other amount of bits can be used.

The process can include operation 914, which involves extracting content from the encoded measurements in operation 912. For example, following operation 914, there can be a number of bits that have been formed from the encoding of the measurements. In some examples, the bits themselves are usable content. In some examples, the bits are converted into a different representation, encoding, or format for use. For instance, the bits can be converted into or otherwise treated as characters, a number, or other kinds of content. As will be further discussed in FIG. 12, the bits may include error detection and error correction information as well as the desired content of the optical code. The process of extracting the content can include using the error detection and error correction information to aid in the extraction of the desired content.

Figure 12:
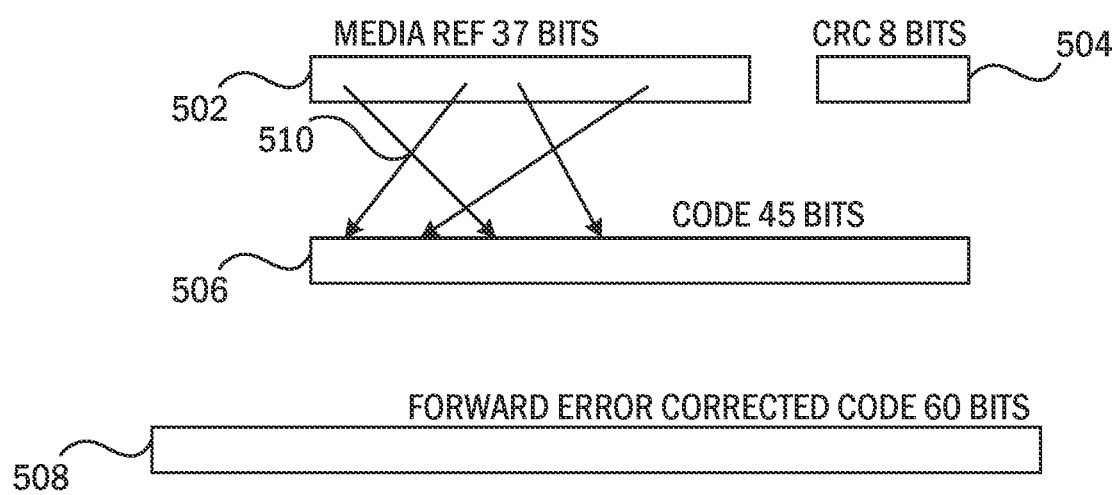
FIG. 12 illustrates an embodiment of processing of a binary code obtained from an optical machine-readable code.

FIG. 12 illustrates an example process of encoding content 502 having error correcting bits 504 into a 60-bit forward error corrected binary code word 508. The content 502 can be a series of bits (e.g., 37 bits) that correspond to, for example, a media reference associated with media content item (e.g., a song, artist, or album). The error correcting bits 504 can be bits for error correction of the content 502. In the illustrated example, the error correcting bits 504 are Cyclic Redundancy Check (CRC) error correcting bits. The data 502 and error correcting bits 504 can be combined to form a code 506. The combination process can involve shuffling 510 the bits. The code 506 can then be transformed into an error correcting code 508, such as a forward error correcting code. The forward error correction used can, for example, be a convolutional code. In the illustrated example, the code 508 is made up of 60 bits, which can be encoded into 20 offsets/distances (bar lengths) using, for example, the Gray codes of TABLE I.

A shuffling process 510 may be used to spread out potential errors (e.g., if a whole bar/distance is missing). Instead of having the encoded bar lengths (e.g., three bits in the example shown in TABLE I) be consecutive, the lost bits are non-consecutive in the code word. This improves the chances for the forward error correction to work when a whole bar or distance is lost. Thus to scan the optical code, after the lengths of the found bars are converted into bits with certainties, the bits are shuffled back to the right order. The now-ordered bits may be fed with the certainties (e.g., bit probabilities or measured potential error) into a decoder. In an example, a Viterbi decoder can be used to perform a maximum likelihood decoding of the forward error corrected code and extract the error corrected bits 506. The error corrected code 506 may be decomposed into media reference bits 502 (e.g., 37 bits) and bits 504 (e.g., 8 bits). In some examples, bits 504 can be or include a checksum. The checksum may be verified and, if it is not correct, the quadrilateral candidate may be discarded. Using this process, eventually a candidate quadrilateral is properly decoded into content, for example, a media reference (e.g., a URL to a location associated with media content or a URI of a media content item).

Figure 13:
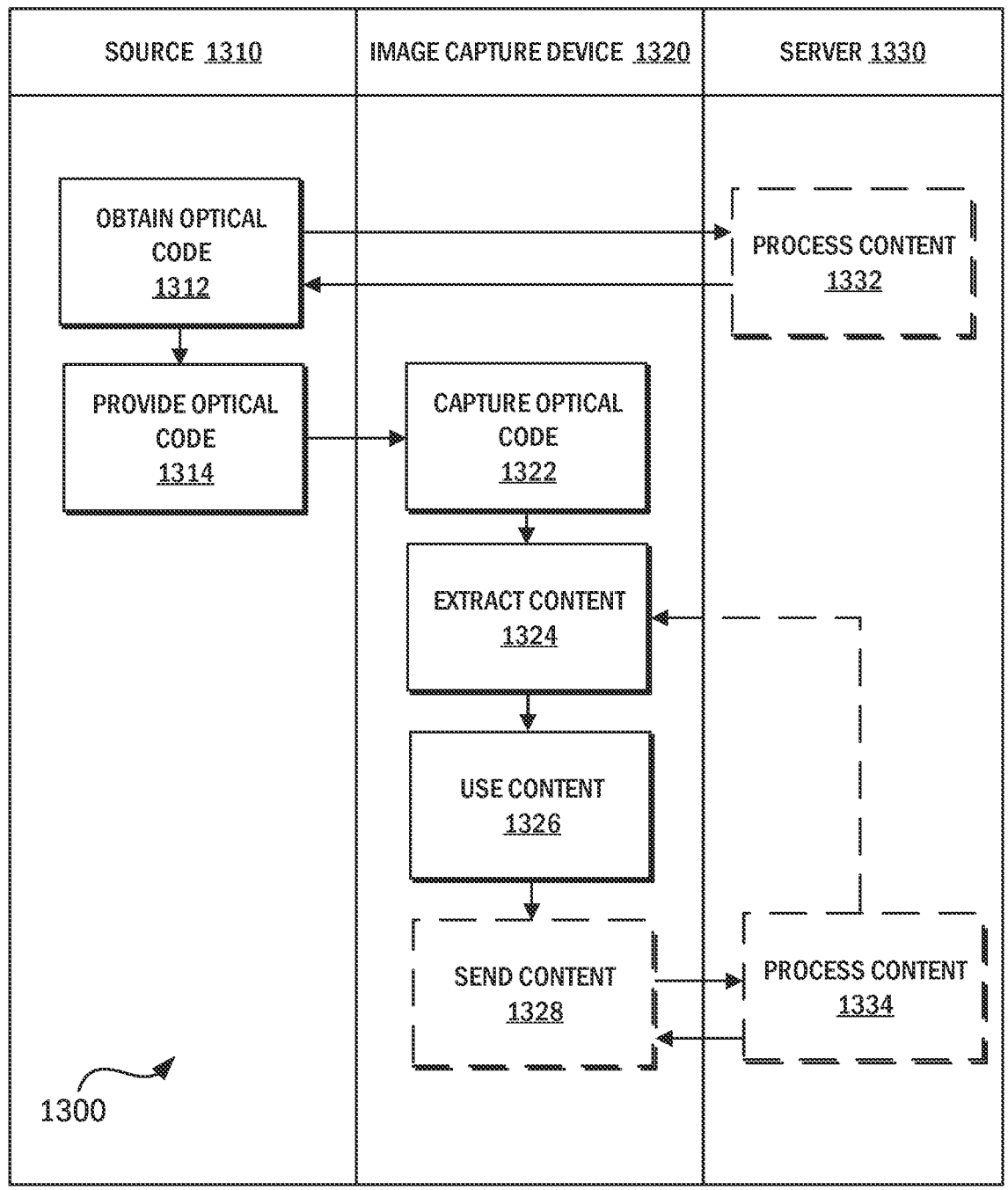
FIG. 13 illustrates an example process for a source to provide content to an image capture device using an optical code.

The content (e.g., media reference used to obtain media content items, a URL, tokens, credentials, or other data) extracted from the optical code can be used in a variety of ways. FIG. 13 illustrates an example process 1300 for a source 1310 to provide content to an image capture device 1320 using an optical code. In some examples, the process 1300 can also include an interaction with a server 1330. The source 1310 is the source of the optical code, which is captured using an image capture device 1320. In many examples, the source 1310 is a computing device that provides the optical code via a display screen. However in other examples, for example where the optical code is provided on a printed medium, the source 1310 can be an organization that generates and publishes the code. Other configurations are also possible.

The process 1300 can begin with operation 1312, which involves the source 1310 obtaining an optical code. The way in which the optical code is obtained can vary depending on the type of content that is to be encoded within the optical code. For example, in some examples, the content to be encoded is local to the source 1310. For instance, the source 1310 can be a smart phone of a person that wants to share a URL or contact information with a friend. In such an example, obtaining the optical code can involve obtaining the URL or contact information stored locally at the source 1310 and generating an optical code at the source 1310 using one or more techniques described herein.

In some examples, the source 1310 can cooperate with the server 1330 or another device to obtain the optical code or content for the optical code. For example, the source 1310 can be a smart phone of a person wanting to share an album with another person. The identification information of the album (e.g., the URI of the album) may be stored locally on the source 1310 or in some instances (e.g., where the album is associated with a streaming provider) the source 1310 may obtain the identification information of the album from another location, such as the server 1330.

In some examples, the process 1300 can involve operation 1332, which involves the server processing content to facilitate the source 1310 obtaining the optical code. For example, the server 1330 may provide the source 1310 with content to provide within the optical code. In another example, the server 1330 itself can generate the optical code and provide it to the source 1310. In still other examples, the server 1330 may include a reference table that associates identifiers with content. This can facilitate the sharing of information with an optical code by allowing the source 1310 to provide an optical code with an identifier rather than the content itself. This can provide a variety of benefits. In one example, the use of a reference table can allow for reduced size of the content needed to be conveyed by the optical code by allowing a relatively smaller identifier to be associated with a relatively longer item of content. For example, the optical code may need only contain the identifier rather than a lengthy piece of content. In another example, this may provide improved security where a user may need to be authenticated prior to using the reference table to look up the content to which the identifier refers.

The process 1300 can further include operation 1314, which involves providing the optical code. The source 1310 can provide the optical code in a variety of different ways. In some examples, where the source 1310 is associated with a display screen (e.g., a computer screen, an electronic billboard display, or a television screen, among others), providing the optical code can include rendering the optical code at the display screen. In another example, providing the optical code can involve causing the optical code to be printed on a physical medium, such as paper, stickers, billboards, boxes, and other physical media. In some examples, the providing of the optical code can be in response to a user sharing a piece of content, such as a media content item.

In some examples the optical code may be provided in an animated fashion to further strengthen the association with sound waves and music. Animation may be generated by generating distances to marks (e.g., bar lengths) by summing a random amount of sine and cosine curves and using a number of samples (e.g., twenty-three samples) from the summed curve as the distances/offsets for the optical code. In some examples, the animated curves do not follow the rule of a minimum offset bar in the beginning and end with a maximum bar in the middle. This speeds up discarding the animated bar as a candidate image. Another animation may be generated by creating a linear fade-in of the optical code from left to right. The code is then initially invisible, then starting from the left to right, the bars both stretch out from the invisible axis (e.g., axis 405) into the proper length and at the same time fade from white to their proper color. After generating enough curves for an animation (e.g., an animation lasting one second), the frames can be stored in a suitable file format, such as a Graphics Interchange Format (GIF), Multiple-image Network Graphics (MNG) format, Portable Network Graphics (PNG) format, and video file formats, among others. After the optical code has been displayed for a period of time (e.g., ten seconds), the animation can be run again.

When the optical code is generated or provided, a color average may be picked from a region (e.g., area 102 of FIG. 5) by picking colors that stand out in the image. Picking such colors can involve determining colors that have more than a threshold amount of contrast to the background by measuring, for example, a brightness value. Brightness values can be determined by, for example, converting the color to its grayscale representation (one way of doing so is to convert RGB to YUV and look at the Y value). The chance that image area will be detected as a separate rectangle may thus be increased. In some examples, the optical code may be inverted. For example, the scanner determines that the code is inverted by comparing the color of the code marks to the code's background color, and if the lines are darker than the tag background the code is considered to be inverted.

The process 1300 can further include operation 1322, which involves the image capture device 1320 capturing the optical code. The image (e.g., a two-dimensional digital image) can be obtained in a variety of ways, such as by being captured by a camera (e.g., a CCD or CMOS image sensor of an image capture device) or selected from a library of photos. In some examples, the user can use a particular application to capture the optical code, such as a software application configured to process optical codes.

The process 1300 can further include operation 1324, which involves extracting content from the captured optical code. This operation can be performed using one or more of the techniques described herein, including but not limited to those techniques described in relation to FIGS. 7 and 9.

In some examples, extracting the content involves identifying an image area in the captured digital image, the image area including the machine-readable code. The method also includes, within the image area, finding a predefined optical start marker that defines a start point and finding a predefined optical stop marker that defines a stop point, and an axis (typically in the form of an imaginary straight line) that is defined between the start point and the stop point. This can further include determining multiple axis points along the axis, typically between the start marker and the stop marker. For each axis point, a first distance within the image area to an optical mark, measured from the axis point in a first direction which is orthogonal to the axis, can be determined. First distances can be translated to a binary code using Gray code. Each first distance may encode at least three bits of the binary code, the combination of which can correspond to the content.

In some examples, extracting the content from the optical machine-readable code further includes finding an optical reference mark at an orthogonal distance from the axis, the orthogonal distance defining a reference distance which the first distances are defined in relation to. In some embodiments, the reference distance is a maximum distance. The reference distance may be positioned, as measured in a direction parallel with the axis, in the middle between the start marker and the stop marker. In some embodiments, each of the first distances, as part of the translating, is defined to have any one of a number of predefined relative distances relative to the reference distance. In some embodiments, the difference between the determined first distance and the nearest predefined relative distances, for each of the axis points, is used as a measurement of certainty. In some embodiments, the measurement of certainty is used in a Viterbi decoder. In some embodiments, the start marker and the stop marker may each define a minimum distance to the axis. Thus, the first distances and/or any second distances may be measured in relation to the minimum distance to the axis (e.g., in addition to being measured in relation to the reference distance).

In some embodiments, extracting content further includes, for each axis point, determining a second distance within the image area to an optical mark, measured from the axis point in a second direction which is opposite to the first direction (and thus also orthogonal to the axis), and translating the second distances to a binary code using Gray code, each second distance encoding at least three bits of the binary code. In some embodiments, it is also determined that the binary code of the second distances is identical to the binary code of the first distances. By the optical code being symmetrical on both sides of the axis, the code may be decoded twice, once on each side of the axis, further ensuring that the decoding is correct. Alternatively, the optical code may intentionally not be symmetrical with the axis as symmetry axis, allowing a second binary code to be encoded to be encoded by the second distances. In some embodiments, the distance between any consecutive two of the axis points is the same along the axis.

The process 1300 can further include operation 1326, which involves using the content extracted from the optical code. How the content is used can vary based on the type of content. For example, the content can be put into a text field (e.g., where the content is a WI-FI password, the content can be placed into a password field) of an application on the image capture device 1320, the content can be added to a data structure (e.g., where the content is contact information), the content can be used to take a particular action (e.g., open an application, start or stop music playback, etc.), or access particular content (e.g., access an album associated with the content), among others.

In some examples, the use of the content can involve cooperation between the image capture device 1320 and the server 1330. Such a process is described in operation 1328, which relates to sending content, and operation 1334, which relates to processing the sent content at the server 1330 or another device.

In some examples, the content describes a media reference used to obtain media content items in cooperation with the server 1330. The media reference can be sent to a server 1330 to acquire a media content item that corresponds to the media reference. For instance, the media reference may be a number associated with a media content item. So a scanned media reference can be decoded to yield an index associated with a media content item. To create the media reference, a number (e.g., a random number) may be allocated on the server 1330 and stored in a table linking the number to the desired media content item (e.g., a playlist, an album, a song, a video, a user profile, or an artist profile). In some examples, the number may be an encrypted consecutively-increasing index counter can be used. In this manner, the operation 1334 can involve determining the desired media content item using the sent content and the table. The server 1330 can then take an action based thereon. For example, the server 1330 can cause the image capture device 1320 to play or display the media content item.

A table or another association between codes and content may be used because the content-storing bits of the code (e.g., content 502 of FIG. 12) may not be enough on their own to store an arbitrary reference (e.g., a URI to every possible song, playlist, video, user, album and artist). The code can, of course, be extended to have more optical marks to be able to encode any media reference directly. After receiving a code, the server 1330 can return a proper media content item to the image capture device 1320 that performed the scan. For example, the server 1330 can cause the image capture device 1320 to play a song or display album associated with the code. If the server 1330 does not find a media reference matching the decoded ID, the server 1330 can respond with a notification to that effect. In such instances, the flow of the process can move back to operation 1324 and repeat the content extraction, using the processing from the server as feedback. For example, the decoding process can use that feedback to know that the candidate shape or other region in operation 708 was actually an incorrect candidate (e.g., did not decode to valid content). The process of decoding can continue for other candidate shapes until a valid code is found or until there are no more candidates. The process may continue without informing the user of the device 1320 of an invalid code until the process is complete.

In an example use case, an optical code can be obtained by a first device from a second device in order to facilitate the association of the second device with an account of a user of the first device. As a specific example, a person may have an account with an audio streaming service. The person may use the service on a smartphone (e.g., the first device) via an application that the person is logged in to, authenticated with, or otherwise associated with. The person may have recently purchased a smart speaker (e.g., the second device) and may want to become associated with the smart speaker with the account (e.g., associate the smart speaker with an account of the person so the speaker can play audio content using the account). The use of an optical code can facilitate this and other processes. Examples of such a system and process are shown in FIG. 14, and FIG. 15, respectively.

Figure 14:
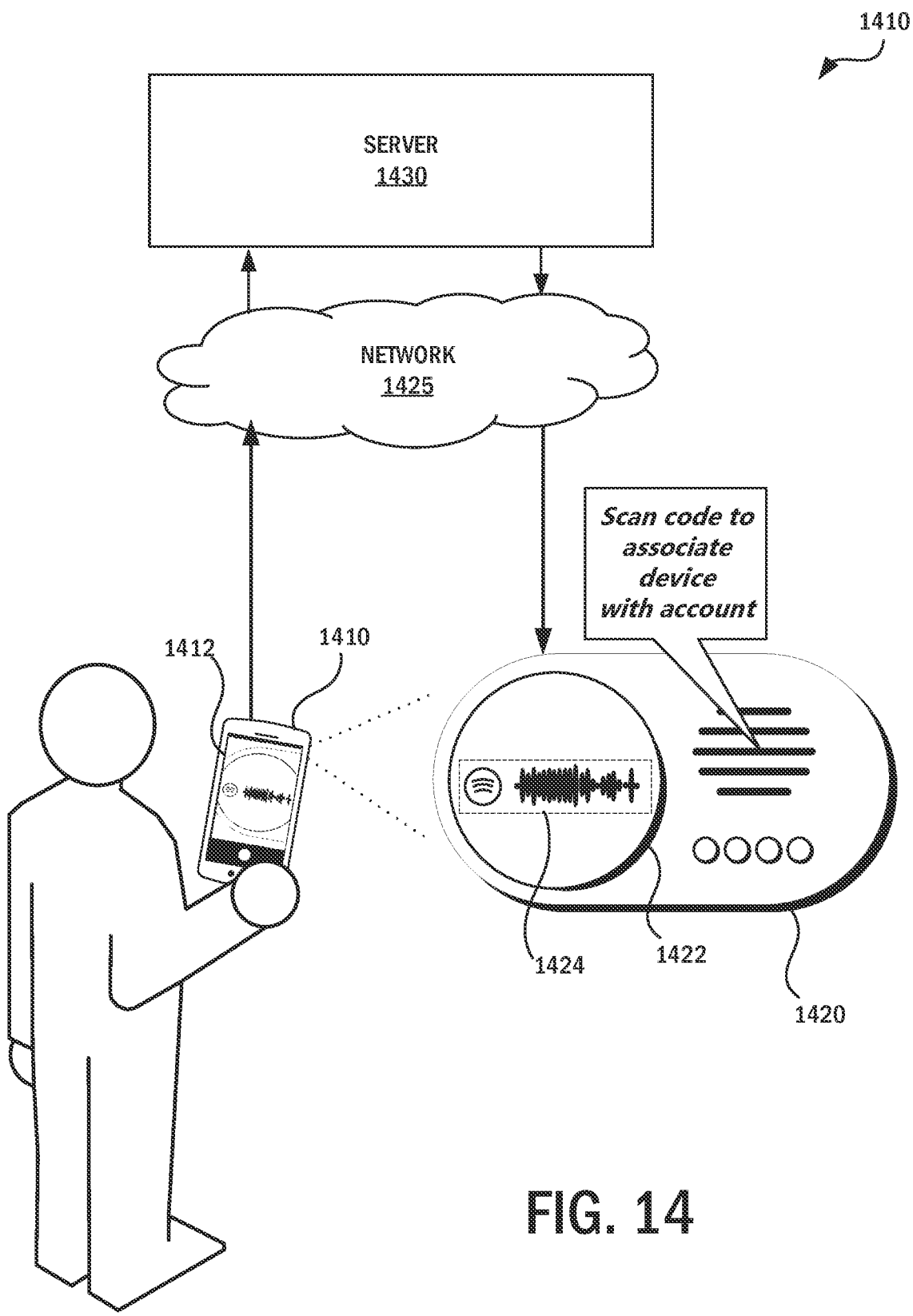
FIG. 14 illustrates an example system in which a first device captures an optical code from a second device to associate the second device with an account of a user at a server.

FIG. 14 illustrates an example system 1400 in which a user is using a first device 1410 to capture an optical code 1424 from a display 1422 of a second device 1420 to associate the second device 1420 with an account of the user at a server 1430 connected to the devices 1410, 1420 over a network 1425. For example, the user may be logged into a service (e.g., a streaming audio service) on an application 1412 running on the first device 1410 and may want to associate the second device 1420 with that account. Continuing the previous example, the application 1412 may be an audio streaming service application associated with the user's account and the user may want to associate the second device 1420 with the account. The optical code 1424 can contain information usable in the association process.

The first device 1410 can be a computing device configured to facilitate the capture, processing, and use of an optical code, such as the previously-described image capture device 2. In many examples, the first device 1410 will be a smartphone, but the first device 1410 may take other forms. The second device 1420 can take many different forms. In the illustrated example, the device 1420 is a smart speaker system having a display, as well as a processor, memory having executable instructions to carry out one or more processes described herein, and an interface for connecting to the server 1430 over the network 1425. In other examples, the device 1420 may be more or less complex. Additional features of the system 1400 will be discussed with reference to FIG. 15. The server 130 can be a computing device having a processor, memory having executable instructions to carry out one or more processes described herein, and an interface for connecting to devices over a network.

Figure 15:
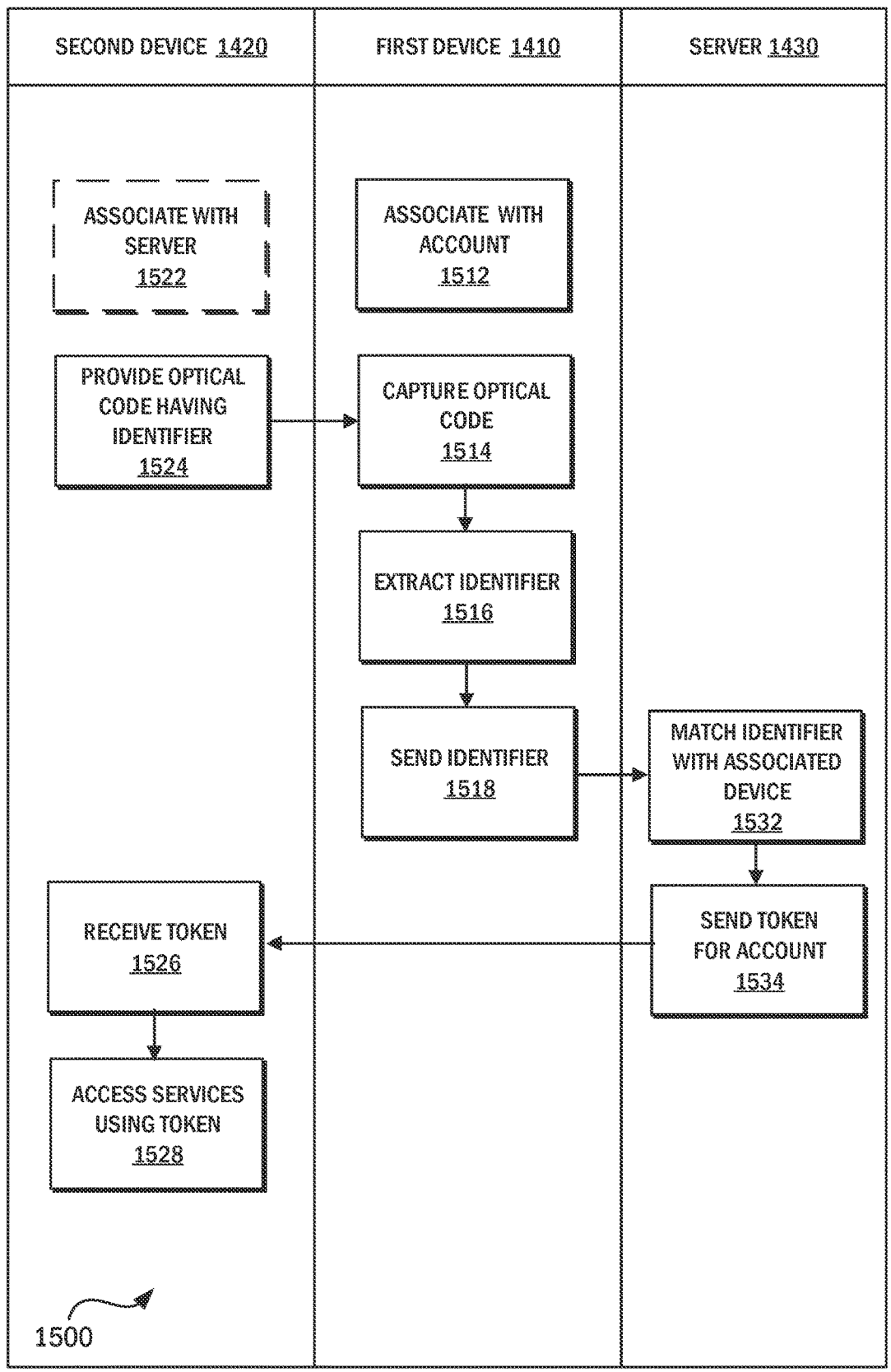
FIG. 15 illustrates an example process for associating a second device with an account of a user on a first device using an optical code.

FIG. 15 illustrates an example process 1500 for associating the second device 1420 with an account of a user on a first device 1410 using the optical code 1424. The process 1500 can include operation 1522, which involves the second device 1420 becoming associated with the server 1430. For example, during manufacturing, provisioning, configuration, or initial setup, the second device 1420 may become known to the server 1430. For instance, the server 1430 may include a data structure containing known devices (e.g., known device identifiers, IMEI numbers, contact information, IP addresses, etc.). This operation 1522 can also involve the server 1430 becoming known to the second device 1420. For example, the second device 1420 may store information for communicating with the server 1430 (e.g., the IP address of the server) in a data structure in memory. In some examples, second device 1420 may be able to connect to the server 1430 but may have limited functionality until the device 1420 is associated with the user's account.

The process 1500 can include operation 1512, which involves a user associating the first device 1410 or the application 1412 with an account of the user. For example, the user may create an account for a service associated with the server 1430 (e.g., an audio streaming service). The user may then associate the account with the device 1410 or an application 1412 running thereon. This may involve logging into the account, obtaining an authentication token, obtaining an authorization token, or carrying out this process 1500, among others.

The process can include operation 1524, which involves the second device 1420 providing an optical code 1424 having an identifier of the device 1420. The optical code 1424 may be provided in many different ways. In the illustrated example, the code 1424 is provided on the display 1422 of the second device 1420. The second device 1420 may provide the code 1424 on the display 1422 in response to being powered on, in response to performing a configuration process, in response to determining it is not associated with an account (e.g., is not authorized or authenticated), in response to receiving a user input (e.g., via a physical or virtual button or other user interface element), or in other situations. In other examples, the optical code 1424 may be affixed to the device (e.g., via a sticker, label, or printed directly on the device 1420) or may be provided with materials associated with the device (e.g., a product manual, tag, sticker, card, box, or other component associated with the device). The device 1420 may prompt the user to scan the code using a voice instruction (e.g., as shown in FIG. 14).

The second device 1420 can obtain the code-to-be-provided in a variety of ways. For example, the second device 1420 may generate the optical code itself. In another example, the optical code can be provided with the second device 1420. For example, the optical code 1424 may be generated by a device other than the second device 1420 and be stored in a memory of the device 1420 or the code may be provided on material (e.g., manual, box, label, etc.) provided with the second device 1420. In yet another example, the second device 1420 can obtain the optical code 1424 (or the content thereof) from the server 1430. For instance, if the second device 1420 is not already associated with an account, the device can be configured to connect to the server 1430 (e.g., using information from operation 1522) over the network 1425 and obtain an optical code for use in associating the device 1420 with an account.

The process 1500 can include operation 1514, which involves capturing the optical code 1424. In the illustrated example of system 1400, the user is capturing the optical code 1424 using the application 1412 that the user is logged in to on the first device 1410. In other examples, the user may use a default camera app of the device 1410 and send the captured image to another device for processing.

The process 1500 can include operation 1516, which involves extracting content from the captured optical code 1424. In the example system 1400, this is performed on the first device 1410 to obtain the identifier of the second device 1420 encoded in the optical code 1424. In some examples, this can involve the first device 1410 executing an application configured to perform the steps of FIGS. 7 and 9. In some examples, the content of the optical code 1424 can itself be an authorization token, an authentication token, or other content that allows the user or the device 1410 to control the device 1420 (e.g., directly or over the server 1430).

The process 1500 can include operation 1518, which involves sending the identifier obtained from the optical code 1424 to the server 1430 over the network 1425. The sending can be performed from the application 1412 that the user is logged in to or in other ways. Along with the identifier, user-specific information can be sent to the server 1430 that allows the server to associate the device identifier with the user's account. For example, the message that includes the device identifier can also include a user account identifier (e.g., a user ID).

The process 1500 can include operation 1532, which involves the server 1430 receiving the information sent from the first device 1410 and matching the identifier with the second device 1420. The server 1430 can use the device identifier to identify the second device 1420 in a variety of ways. This operation 1532 can involve the server 1430 determining how to contact the second device 1420, such as the correct address (e.g., IP address) and protocols to use to contact the second device 1420. In some examples, the identifier itself contains sufficient information to contact the device 1420. In other examples, the server 1430 can use the identifier to obtain the information. For example, the server 1430 can use the identifier to look up contact information in a data structure established in operation 1522. This operation 1532 can further involve associating the second device 1420 with the user's account. For instance, the association can involve registering the device 1420 at the server as associated with the user's account, granting the device 1420 permission to take actions associated with the user's account, and logging the user in to the device, among others. For example, the association can involve updating a data structure stored at the server 1430 to include the relevant information.

The process 1500 can include operation 1534, which involves the server 1430 sending a token for the user's account to the second device 1420 using the contact information obtained in operation 1532 and the account information. The operation 1530 can involve sending an authentication token (e.g., an OPENID token) to the device 1420, sending an authorization token (e.g., an OAUTH token) to the device 1420, or taking other actions.

The process 1500 can include operation 1526, which involves the second device 1420 receiving the token sent by the server 1430.

The process 1500 can include operation 1528, which involves the second device 1420 using the token to access services associated with the user's account. For example, the second device 1420 may use the token with API requests to the server 1430 in order to access services on behalf of the user's account. For example, where the account is an account associated with a streaming audio service and the second device 1420 is a smart speaker, this can involve the second device 1420 obtaining streaming audio content from the server 1430 that is associated with the user's account. In some examples, this can also involve the user controlling the second device 1420 with the first device 1410.

The present disclosure has mainly been described above with reference to particular embodiments. However, as is readily appreciated by a person skilled in the art, other embodiments than the ones disclosed above are equally possible within the scope of the present disclosure, as defined by the appended claims. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system comprising:
   a server computing device;
   a first device associated with a user account;
   a second device unassociated with the user account, wherein to associate the second device with the user account includes:
      providing, on the second device, an optical code having an identifier of the second device;
      capturing, using the first device, the optical code provided by the second device;
      extracting, using the first device, the identifier from the optical code;
      sending, using the first device, the identifier to the server computing device;
      receiving, at the second device, from the server computing device, an authorization token for the user account; and
      using the authorization token, accessing one or more services associated with the user account with the second device.

2. The system of claim 1, wherein the server computing device maintains a list of devices that are associated with the server computing device.

3. The system of claim 1, wherein providing the optical code includes affixing the optical code on the second device or on materials associated with the second device.

4. The system of claim 1, wherein providing the optical code includes displaying the optical code on a display screen of the second device.

5. The system of claim 1, wherein to associate the second device with the user account further includes:
   receiving a user input on the second device to display the optical code.

6. The system of claim 1, wherein the one or more services include audio streaming services.

7. The system of claim 1, wherein the first device is a smart phone with a camera to capture the optical code.

8. The system of claim 1, wherein the second device is a smart speaker.

9. The system of claim 1, wherein the optical code is generated by translating the identifier of the second device into mark distances, each of the mark distances being measured from an axis point on an axis in a direction orthogonal to the axis and forming a mark at the end of each of the mark distances.

10. A method to associate a user account associated with a first device with a second device, the method comprising:
   providing, on the second device, an optical code having an identifier of the second device;

capturing, using the first device, the optical code provided by the second device;

extracting, using the first device, the identifier from the optical code;

sending, using the first device, the identifier to a server computing device;

receiving, at the second device, a token for the user account from the server computing device; and at the second device, accessing one or more services associated with the user account using the token.

11. The method of claim 10, wherein the second device is unassociated with the user account before receiving the token for the user account.

12. The method of claim 10, wherein the one or more services include audio streaming services.

13. The method of claim 10, wherein providing the optical code includes affixing the optical code on the second device or on materials associated with device.

14. The method of claim 10, wherein providing the optical code includes displaying the optical code on a display screen of the second device.

15. The method of claim 10, further comprising:
receiving a user input on the second device to provide the optical code.

16. The method of claim 10, wherein the one or more services include audio streaming services.

17. The method of claim 10, wherein the first device is a smart phone with a camera to capture the optical code.

18. The method of claim 10, wherein the second device is a smart speaker.

19. The method of claim 10, wherein the optical code is generated by translating the identifier of the second device into mark distances, each of the mark distances being measured from an axis point on an axis in a direction orthogonal to the axis and forming a mark at the end of each of the mark distances.

20. A system comprising:
a server computing device that is associated with an audio streaming service;

a mobile computing device with a camera, wherein the mobile computing device is associated with a user account for the audio streaming service;

a smart speaker device unassociated with the user account, wherein to associate the smart speaker device with the user account includes:
displaying, on the smart speaker device, an optical code having an identifier of the smart speaker device;

capturing, using the mobile computing device, the optical code displayed by the smart speaker device;

extracting, using the mobile computing device, the identifier from the optical code;

sending the identifier from the mobile computing device to the server computing device;

receiving, at the smart speaker device, from the server computing device, an authorization token for the user account;

using the authorization token, associating the smart speaker device to the user account; and accessing the audio streaming service from the smart speaker device.

\* \* \* \* \*